United States Patent [19]

Rychlik, deceased et al.

[11] 4,320,725
[45] Mar. 23, 1982

[54] PUFFING SWIRLER

[76] Inventors: Frank J. Rychlik, deceased, late of Chicago, Ill.; Alan F. Rychlik, executor, 4 Hilltop Ct., Hawthorne Woods, Ill. 60141

[21] Appl. No.: 124,580

[22] Filed: Feb. 25, 1980

[51] Int. Cl.³ .................................. F01L 3/06
[52] U.S. Cl. ................. 123/188 M; 123/306; 123/188 AF; 123/188 VA
[58] Field of Search .... 123/188 M, 188 VA, 188-AF, 123/306, 251, 262

[56] References Cited

U.S. PATENT DOCUMENTS

| | | | |
|---|---|---|---|
| 1,555,991 | 10/1925 | Konar | 123/188 VA |
| 1,812,262 | 6/1931 | Gardner et al. | 123/188 |
| 2,052,874 | 9/1936 | Frelin | 123/188 |
| 2,714,374 | 8/1955 | Hennig | 123/188 VA |
| 2,768,617 | 10/1956 | Tierney, Jr. et al. | |
| 3,408,992 | 11/1968 | Un Seggern et al. | |
| 3,762,381 | 10/1973 | Dave | |
| 3,821,941 | 7/1974 | Rychlik | |
| 3,927,655 | 12/1975 | Goto et al. | |
| 3,980,059 | 9/1976 | Noguchi et al. | |
| 4,014,300 | 5/1977 | Klomp | |
| 4,207,854 | 6/1980 | Alford et al. | 123/188 M |
| 4,256,062 | 3/1981 | Schafer | 123/188 M |

FOREIGN PATENT DOCUMENTS

| | | | |
|---|---|---|---|
| 0205291 | 9/1959 | Austria | 123/306 |
| 0405975 | 2/1934 | United Kingdom | 123/306 |
| 2041443 | 9/1980 | United Kingdom | 123/188 M |
| 0476366 | 11/1975 | U.S.S.R. | 123/188 AF |

Primary Examiner—P. S. Lall
Attorney, Agent, or Firm—Wegner, Stellman, McCord, Wiles & Wood

[57] ABSTRACT

A puffing swirler for use in an internal combustion engine. The puffing swirler causes the air and vaporized fuel mixture to have a controlled high velocity swirling action within the piston cylinder of the engine to provide improved high efficiency combustion of the fuel therein. The puffing swirler includes a flow directing deflector movable with the inlet valve and defining a plurality of swirl-inducing passages. A flow control device is provided for preventing delivery of the fuel fluid to the inlet port until the piston has moved substantially from the top position toward the bottom position thereof, thereby producing a substantial preselected pressure differential between the fluid supply and the cylinder to effect the desired puffing delivery of the fluid to the cylinder. Structure may be provided to releasably retain the flow control device in the full open position as during high speed operation of the engine. The puffing swirler may further include structure to provide delivery selectively through one or more swirl-inducing passages of the flow directing device. The flow control device may be made adjustable for adjusting the pressure differential at which the puff delivery takes place.

22 Claims, 5 Drawing Figures

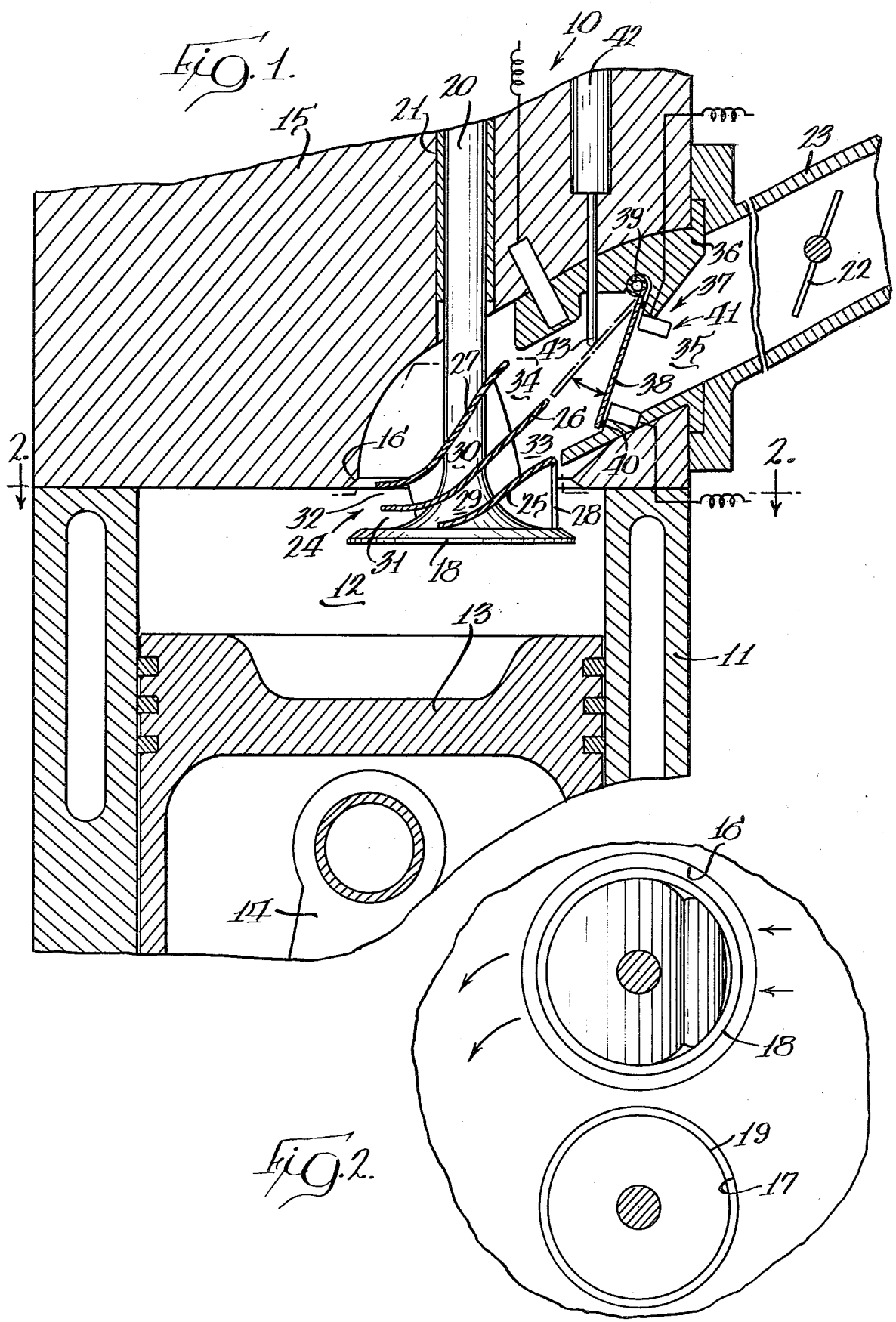

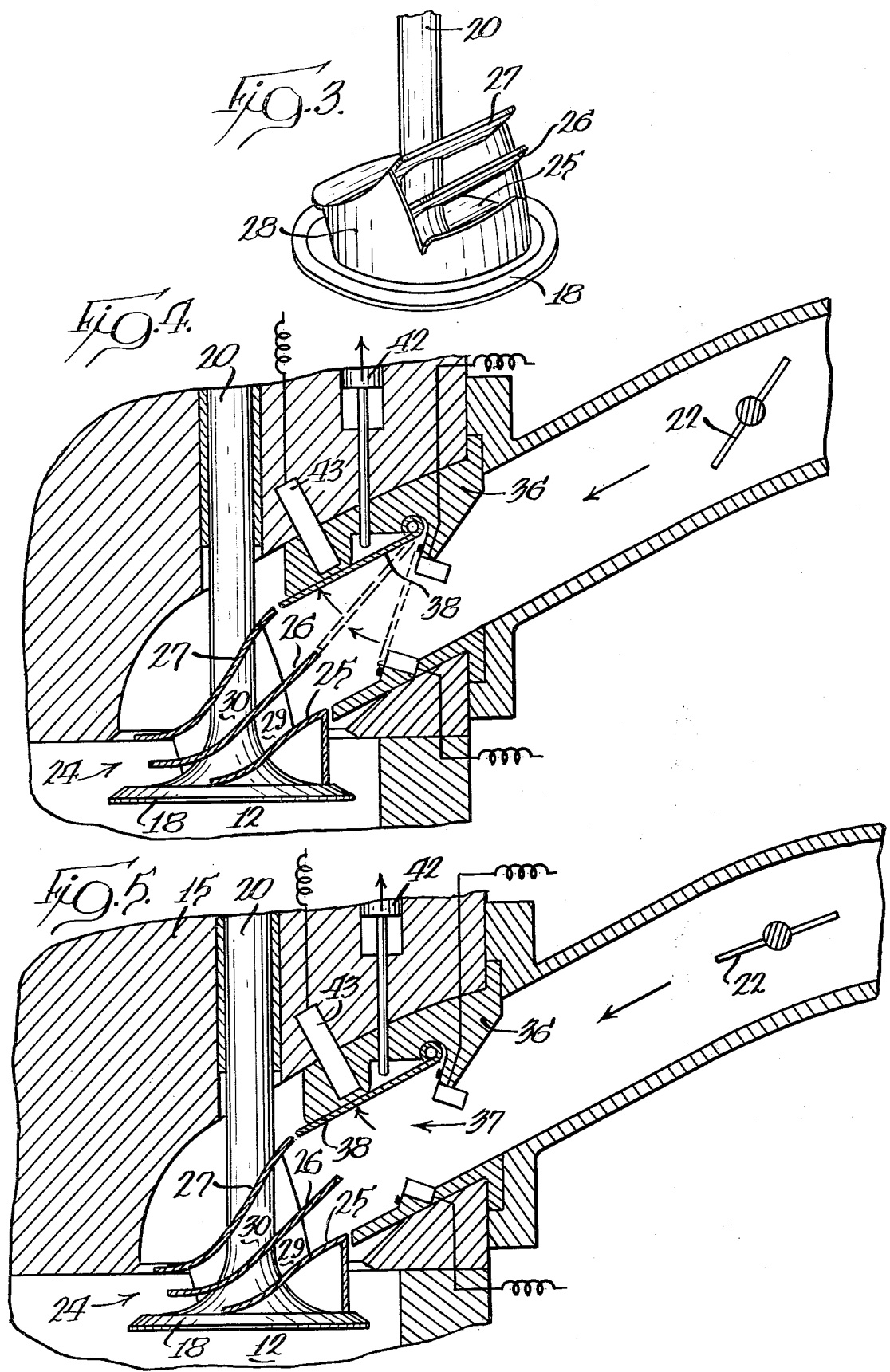

PUFFING SWIRLER

BACKGROUND OF THE INVENTION

1. Field of the Invention

This invention relates to internal combustion engines and in particular to improved means for effecting improved efficiency of the fuel combustion therein.

2. Description of the Prior Art

In my prior U.S. Pat. No. 3,821,941, entitled Valving for Internal Combustion Engine, issued July 2, 1974, I disclosed a modified two-cycle stratified charge engine utilizing a novel means of induction of fuel-air mixture into the combustion chamber whereby a residual fireball was formed in the combustion chamber. As pointed out in my prior patent, the provision of this cone of hot gas provides improved measured performance in such an engine.

John Konar, in U.S. Pat. No. 1,555,991, shows a four-cycle gas engine wherein means are provided to give a swirling motion to the incoming air-fuel mixture. Konar teaches that the use of the swirling movement cleanses the cylinders of carbon and heats the less volatile fuel particles of the new charge with the burnt charge without heating the whole charge. Konar teaches the use of slanting screw blades in the inlet port which are heated by close proximity to the intake valve for volatizing the fuel mixture in thin slices. The arrangement is such that the sliced charge passes against the hot valve disc so as to further volatize heavier fuel particles by heat transfer therewith. Konar teaches that the air and fuel mixture be drawn into the cylinder as soon as the intake valve opens.

Joseph Gardner et al, in U.S. Pat. No. 1,812,262, show an inlet valve for an internal combustion engine having a baffle mounted on the back thereof for causing swirling motion of the charge around the cylinder.

Fritjov Felin, in U.S. Pat. No. 2,052,874, shows a valve mechanism similar to that of Gardner et al in having a baffle on the valve backside.

William T. Tierney, Jr. et al show, in U.S. Pat. No. 2,768,617, an internal combustion engine which is again similar to Gardner et al in providing a baffle or shroud on the intake valve.

In U.S. Pat. No. 3,408,992, Ernest A. von Seggern et al show an internal combustion engine wherein an auxiliary valve is provided in the intake manifold in close proximity to the intake valve to prevent backflow of exhaust gases into the manifold. Von Seggern et al teach that such backflow might be prevented if the opening of the intake valve were delayed until the pressure in the cylinder is equal to or less than the pressure in the manifold. Von Seggern et al teach that it would be more practical to utilize the disclosed auxiliary valve for this purpose.

Sharad M. Dave, in U.S. Pat. No. 3,762,381, shows an internal combustion engine having a movable sleeve for effectively controlling the timing of the opening of the intake valve.

In U.S. Pat. No. 3,927,655, Kenji Goto et al show an internal combustion engine having a vortex generating combustion chamber.

Masaki Noguchi et al, in U.S. Pat. No. 3,980,059, show an internal combustion engine wherein the valve is provided on its backside with a deflector, such as discussed above relative to the Gardner et al patent.

A recent U.S. Pat. No. 4,014,300 of Edward D. Klomp, shows an internal combustion engine having a number of arrangements for segregating the rich and lean mixtures in the cylinder in a vortical flow.

SUMMARY OF THE INVENTION

As discussed above, the prior art patents teach the desirability of providing a swirling movement of the air-fuel mixture in the engine cylinder. A number of the prior art patents teach the desirability of delaying delivery of the air-fuel mixture to the cylinder, such as for equalizing pressure conditions in the engine. The present invention comprehends a structure for providing an improved puffed swirling action in the engine cylinder whereby improved efficiency in the internal combustion process is effected.

More specifically, the present invention comprehends providing means in an internal combustion engine for causing a high speed, puffed swirling movement of the air-fuel charge in the engine cylinder so as to provide a combustion efficiency substantially surpassing that of the prior art structures discussed above. The swirling action has been found to generate an improved fireball of hot gases from the previous cycle giving off heat to the air-fuel charge and bringing it to a highly volatile state for improved combustion.

More specifically, the invention comprehends the provision of such an internal combustion engine, including flow directing means for directing the air-fuel mixture through the inlet port of the engine cylinder to swirl about the axis thereof and flow control means for preventing delivery of the fluid to the inlet port until the piston is moved substantially from the top position toward the bottom position whereby the substantial, preselected pressure differential is produced before the air-fuel mixture is released to the cylinder, thereby to cause a puff delivery thereof providing an enhanced swirling of the fluid in the cylinder. It has been found that with the use of the improved swirl-inducing means, a substantial increase in the number of swirls of the fuel mixture in the cylinder is obtained so as to provide enhanced combustion efficiency.

By concentrating the air-fuel mixture as a result of the improved swirling action, highly attenuated ratios of fuel to air may be utilized while yet positive effective combustion thereof is obtained.

In the illustrated embodiment, the flow directing means are defined by deflectors movably mounted on the valve. The flow control means is defined by a control valve having means for retaining the valve in a fluid flow preventing disposition until the desired pressure differential is reached.

In the illustrated embodiment, the means for retaining the valve in the closed disposition comprises electromagnetic means which may be utilized to permit adjusting of the release pressure differential.

In the illustrated embodiment, means are provided for releasably selectively continuously holding the valve in the fully open position as during high speed operation of the engine, and more specifically, are disclosed as providing electromagnetic means.

The invention further comprehends providing means for selectively limiting the movement of the control valve away from the closed position, and in the illustrated embodiment, the movement limiting means may be coordinated with the flow directing means so as to provide delivery through one or more of a plurality of swirl-inducing passages of the flow directing means. In the fully open position of the valve, the air-fuel mixture is passed through all of the flow directing means passages.

In the illustrated embodiment, the flow control means comprises a flap valve with the magnetic means holding the flap valve releasably in a closed position extending across the air-fuel supply passage.

The magnetic retaining means may act directly on the flap valve for holding the valve in a closed position until the desired pressure differential occurs thereacross. The means for holding the flap valve in the fully open position, in the illustrated embodiment, comprise electromagnetic means acting directly against the valve.

The puffing swirling means of the present invention provides an improved, low cost means for substantially improving the efficiency of combustion in an internal combustion engine. As discussed above, it has long been a desideratum in the internal combustion art to provide improved mixing of the air and fuel in the piston cylinder and a number of devices have been developed for effecting a swirling movement of the air-fuel mixture in the piston cylinder towards improving such efficiency. The present invention provides a novel, simple modification of the prior art swirling devices wherein a puffing action is employed to substantially enhance the efficiency of the swirling movement so as to provide substantially improved engine performance, fuel economy, and low unburned emissions.

BRIEF DESCRIPTION OF THE DRAWING

Other features and advantages of the invention will be apparent from the following description taken in connection with the accompanying drawing wherein:

FIG. 1 is a fragmentary vertical section of an internal combustion engine having improved means for effecting a puffed swirling movement of the air-fuel mixture embodying the invention;

FIG. 2 is a transverse section taken substantially along the line 2—2 of FIG. 1;

FIG. 3 is a fragmentary isometric view of the intake valve provided with flow directing means embodying the invention;

FIG. 4 is a fragmentary vertical section of the engine structure illustrating the movement of the flow control valve from an intermediate position to the fully open position as during increase in speed of operation of the engine; and FIG. 5 is a fragmentary vertical section illustrating the arrangement of the structure when the engine is operating at high speed.

DESCRIPTION OF THE PREFERRED EMBODIMENT

In the exemplary embodiment of the invention as disclosed in the drawing, an internal combustion engine generally designated 10 is shown to include a cylinder 11 defining a piston chamber 12 in which a piston 13 is reciprocably movable as a result of combustion of fuel in chamber 12. The piston may be provided with a conventional crank arm 14 for transmitting the movement of the piston to a conventional crankshaft (not shown). Chamber 12 is closed by an overlying head 15 which may be provided with a conventional intake port 16 and exhaust port 17 which are selectively closed by intake valve 18 and exhaust valve 19, respectively.

As shown in FIG. 1, intake valve 18 is provided with a valve stem 20 slidably mounted in a sleeve 21 carried by engine head 15 for selectively positioning the valve across the port 16 or spaced inwardly therefrom, as illustrated in FIG. 1. In the open position of valve 18, as shown in FIG. 1, a combustible mixture of air and vaporized fuel is admitted to port 16 into the combustion chamber 12 under the control of a throttle valve 22 disposed within a supply manifold 23.

The present invention is concerned with providing the air-fuel mixture to the piston chamber 12 so as to have an improved swirling movement in the piston chamber providing improved operation of the engine.

More specifically, as illustrated in FIG. 1, the invention comprehends providing in association with the air-fuel delivery means a flow directing means generally designated 24 arranged to direct the air-fuel fluid through the inlet port 16 to swirl about the axis of cylinder 11 during the piston movement. In the illustrated embodiment, the flow directing means is defined by a plurality of deflectors 25, 26 and 27 cirumferentially partially enclosed in a cylindrical shroud 28 and fixedly mounted to the valve 18 about the stem 20, as shown in FIG. 3.

The deflectors cooperatively define a pair of swirl-inducing passages 29 and 30 having outlets 31 and 32, respectively, opening generally transversely to the axis of the piston chamber 12, as illustrated in FIG. 1. The inlets 33 and 34 of the passages 29 and 30, respectively, open to a valve chamber 35 defined by an insert 36 carried by head 15 and communicating with the supply manifold 23.

The invention comprehends providing, in combination with the flow directing means 24, a flow control means generally designated 37 for cooperating with the flow directing means to provide a puffed swirling delivery of the air-fuel fluid to the piston chamber 12 providing substantially improved efficiency in the operation of engine 10. More specifically, as seen in FIG. 1, the flow control means includes a flap valve 38 swingably mounted on a pivot 39 to seat against an annular valve seat 40 extending about insert 36 for closing the valve chamber 35. As shown in FIG. 1, the flap valve 38 may be gravity biased to the closed position. However, the invention comprehends the provision of retaining means generally designated 41 comprising a plurality of electromagnets for providing a releasable, positive retention of the flap valve in the closed position illustrated in FIG. 1 until such time as a sufficient pressure differential exists across the flap valve to overcome the retaining force of the electromagnet means 41 and cause the valve to swing away from valve seat 40.

The permissible movement of the flap valve is controlled by an adjustable stop 42 mounted in head 15 and projecting into valve chamber 35 to selectively dispose a tip portion 43 thereof in the path of movement of the flap valve, as illustrated in FIG. 1. In the disposition of the stop 42 of FIG. 1, the flap valve is permitted to move to a preselected intermediate position aligned with the deflector 26 so that the air-fuel fluid is directed solely through the passage 29 for a concentrated delivery of the fluid through the outlet 31 under such low speed operation conditions of the engine. The pressure differential necessary to overcome the electromagnetic means 41 is preselected so as to assure that when the valve 28 breaks free from the electromagnetic means, a substantial pressure force is exerted to cause a puffing movement of the air-fuel fluid providing a high speed swirling production thereof from the passage outlet 31 into the piston chamber 12 for an improved optimum swirling action in the piston chamber during the piston movement and prior to the firing of the charge.

Thus, each time the piston moves down sufficiently on the intake stroke to produce the necessary pressure differential across flap valve 38 to overcome the electromagnetic retention means, a puffed swirled delivery of the air-fuel mixture is effected into the combustion chamber 12. As the electromagnetic means 41 may be suitably controlled by conventional current control means (not shown), the pressure differential at which the flap valve swings from the closed position of FIG. 1 may be adjusted so as to provide an optimization of the puff swirling action.

Movement of the stop 42 may be coordinated with the setting of throttle 22 so that as the throttle is moved further to increase the speed of the engine, such as to the position of FIG. 4, the stop may be retracted sufficiently to permit the flap valve to swing from the closed position of FIG. 1 to the fully open position shown in full lines in FIG. 4 during each fuel delivery operation. As shown in FIG. 4, under the increased speed conditions, the air-fuel fluid is permitted to flow not only through passage 29 but also through passage 30 of the flow directing means 24 while providing the delivery with the puff swirling action as discussed above.

When the engine is caused to operate at high speed, such as with the throttle 22 in the fully open arrangement of FIG. 5, it has been found that the use of the improved flow directing means 24 is sufficient to cause a desired high speed swirling movement of the air-fuel fluid in the piston chamber 12 so that the use of the flow control means 37 to provide the puffing action discussed above may be omitted. To this end, an electromagnet 43 may be provided in head 15 and insert 36 which, when energized, retains the flap valve 38 in the fully open position illustrated in FIG. 5. Energization of the electromagnet 43 may be coordinated with the disposition of the throttle valve 22 by any suitable means, as will be obvious to those skilled in the art, so as to cause the maintained disposition of the flap valve 38 in the fully open position only at preselected high speed operation of the engine. As illustrated in FIG. 5, under such high speed operation, the stop 42 is retracted and fuel delivery to the piston chamber is controlled solely by the valve 18 and flow directing means 24, as discussed above.

Stem 20 may be provided with a noncircular cross section or other suitable means for preventing rotation thereof to assure the alignment of the flow directing means passage inlets 33 and 34 with the valve chamber 35.

As will be further obvious to those skilled in the art, the retaining magnet means 41 may be defined by fixed magnets selected to provide a single desired retaining force in controlling the puffing action. Further, as will be obvious to those skilled in the art, the control of stop 42 may be effected by any suitable means, such as means coordinated with the setting of throttle 22 so as to selectively dispose the stop in any desired intermediate position in controlling the limited movement of the flap valve.

As illustrated in FIGS. 1, 4 and 5, the outets of the swirl-inducing passages 29 and 30 are directed substantially transversely to the axis of the piston chamber 12, thereby causing a high speed puffed swirling action immediately adjacent the cylinder head 15. The improved puffed delivery of the air-fuel fluid assures a high swirl rate sufficient to cause the fluid to swirl about the axis of the piston cylinder chamber a substantial number of times before ignition thereof. As discussed above, it has been found desirable to effect a swirling movement of the incoming air-fuel fluid. However, it has been found that the prior art structures provide only limited swirling movement, particularly at low speed operation of the engine. The present invention, in utilizing the improved puff-swirl action, has been found to provide a substantial increase in the desirable swirling movement of the air-fuel mixture within the piston cylinder. More specifically, it has been found that the invention provides for upwards of five to ten complete swirls of the fluid in the piston chamber. As a result of the improvement in efficiency, reduced fuel-to-air mixtures may be utilized efficiently such as ratios of up to 20- to 30-to-1 in the fuel supply while yet assuring that in the firing portion of the swirling fluid, the more concentrated ratio necessary for proper combustion is obtained.

It appears that the improved surge, or puff, action in the initiation of the swirl cause an improved air piston action by the combustible fluid tending to clear the residual exhaust products in the cylinder as it moves downwardly in following the piston. The exhaust products are effectively captured in the center of the swirling fluid to form a hot ball at the end of the intake stroke, providing substantially improved efficiency in the utilization of the fuel in the operation of the engine.

Transfer heat from the fireball provides improved combustion of the incoming fuel fluid. At the same time, the completion of combustion of any partially oxidized fuel in the fireball is effected, thereby increasing overall efficiency in the engine and reducing undesirable unwanted waste products. The arrangement of the flow directing means substantially perpendicularly to the axis of the cylinder enhances the desirable air piston action of the incoming swirling fluid providing further improved efficiency in the combustion process.

Thus, as discussed above, the present invention provides an improved puffed-swirling movement to the air-fuel mixture in an engine, such as a four-cycle engine to provide an improved fireball combustion process comprising a further improvement over that obtained in the two-cycle engine structure of my earlier U.S. Pat. No. 3,821,941.

The foregoing disclosure of specific embodiments is illustrative of the broad inventive concepts comprehended by the invention.

What is claimed is:

1. In an internal combustion engine having means defining a cylinder defining an inlet port and an outlet port, a piston disposed in said cylinder for reciprocation between a top position adjacent the inlet port and a bottom position spaced therefrom, means for supplying a combustible fluid comprising a mixture of air and vaporized fuel to said inlet port, and a valve movably positionable for selectively closing said inlet port, the improvement comprising:
   flow directing means defining a plurality of swirl-inducing passages for directing said fluid through said inlet port to swirl about the axis of the cylinder during the piston movement; and
   selecting means for selectively directing the fluid into a selected number of said swirl-inducing passages.

2. The internal combustion engine structure of claim 1 wherein said number of swirl-inducing passages is two and said selecting means directs the fluid selectively into one or both of said passages.

3. The internal combustion engine structure of claim 1 further including releasable means for retaining said selecting means in a disposition continuously directing fluid to all of said passages as during high speed operation of the engine.

4. In an internal combustion engine having means defining a cylinder defining an inlet port and an outlet port, a piston disposed in said cylinder for reciprocation between a top position adjacent the inlet port and a bottom position spaced therefrom, means for supplying a combustible fluid comprising a mixture of air and vaporized fuel to said inlet port, and a valve movably positionable for selectively closing said inlet port, the improvement comprising:

flow directing means for directing said fluid through said inlet port to swirl about the axis of the cylinder during the piston movement; and flow control means for preventing delivery of said fluid to said port until the piston has moved substantially from the top position toward said bottom position, whereby a substantially preselected pressure differential is produced between the fluid supply and the cylinder at the inlet port to cause the fluid control means to break free and provide immediate communication between said fluid supply and cylinder to cause a puffed delivery of said fluid to the cylinder upon establishment of said communication, thereby to provide an enhanced swirling of the fluid in the cylinder.

5. The internal combustion engine structure of claim 4 wherein said flow directing means comprises deflector means movable with said valve.

6. The internal combustion engine structure of claim 4 wherein said flow control means comprises a control valve and means for retaining the control valve in a fluid flow preventing disposition until the pressure differential across the valve reaches said preselected pressure differential.

7. The internal combustion engine structure of claim 4 wherein said flow control means comprises a control valve and magnetic means for retaining the control valve in a fluid flow preventing disposition until the pressure differential across the valve reaches said preselected pressure differential.

8. The internal combustion engine structure of claim 4 wherein said flow control means comprises a control valve and adjustable magnetic means for retaining the control valve in a fluid flow preventing disposition until the pressure differential across the valve reaches said preselected pressure differential.

9. The internal combustion engine structure of claim 4 wherein said flow control means comprises a control valve, means for retaining the control valve in a fluid flow preventing disposition until the pressure differential across the valve reaches said preselected pressure differential, and means for releasably selectively continuously holding the control valve in a fully open position as during high speed operation of the engine.

10. The internal combustion engine structure of claim 4 wherein said flow control means comprises a control valve, means for retaining the control valve in a fluid flow preventing disposition until the pressure differential across the valve reaches said preselected pressure differential, and magnetic means for releasably selectively continuously holding the control valve in a fully open position as during high speed operation of the engine.

11. The internal combustion engine structure of claim 4 wherein said flow control means comprises a control valve, means for retaining the control valve in a fluid flow preventing disposition until the pressure differential across the valve reaches said preselected pressure differential, and means for selectively limiting the movement of the control valve away from the fluid flow preventing disposition.

12. The internal combustion engine structure of claim 4 wherein said flow directing means comprises deflector means defining a plurality of swirl-inducing passages.

13. The internal combustion engine structure of claim 4 wherein said flow directing means comprises deflector means defining a plurality of swirl-inducing passages and said structure further includes means for selectively limiting the movement of the control valve away from the fluid flow preventing disposition to permit flow of said fluid through a selected number of said swirl-inducing passages.

14. The internal combustion engine structure of claim 4 wherein said flow directing means comprises deflector means defining a plurality of swirl-inducing passages and said structure further includes means for selectively limiting the movement of the control valve away from the fluid flow preventing disposition to permit flow of said fluid through one or more of said swirl-inducing passages.

15. The internal combustion engine structure of claim 4 wherein said flow directing means comprises deflector means defining a plurality of swirl-inducing passages and said structure further includes means for selectively limiting the movement of the control valve away from the fluid flow preventing disposition to permit flow of said fluid through one or more of said swirl-inducing passages, and means for selectively continuously holding the control valve in a fully open position as during high speed operation of the engines to permit maintained fluid flow through all of said swirl-inducing passages during such high speed operation.

16. In an internal combustion engine having means defining a cylinder defining an inlet port and an outlet port, a piston disposed in said cylinder for reciprocation between a top position adjacent the inlet port and a bottom position spaced therefrom, means for supplying a combustible fluid comprising a mixture of air and vaporized fuel to said inlet port, and a valve movably positionable for selectively closing said inlet port, the improvement comprising:

flow directing means for directing said fluid through said inlet port to swirl about the axis of the cylinder during the piston movement;

a flap valve for controlling delivery of said fluid to said port; and retaining means for retaining the flap valve in a closed position preventing such delivery until the piston has moved substantially from the top position toward said bottom position whereby a substantially preselected pressure differential is produced across said flap valve before the flap valve breaks open to cause a puffed initial delivery of said fluid to the cylinder, thereby to provide an enhanced swirling of the fluid in the cylinder.

17. The internal combustion engine structure of claim 16 wherein said retaining means comprise magnetic means.

18. The internal combustion engine structure of claim 16 wherein said retaining means comprise electromagnetic means.

19. The internal combustion engine structure of claim 16 further including selectively positionable means for controlling the maximum open postion of said flap valve.

20. The internal combustion engine structure of claim 16 further including means for selectively continuously holding said flap valve in a fully open position as during high speed operation of the engine.

21. The internal combustion engine structure of claim 16 further including magnetic means for selectively continuously holding said flap valve in a fully open position as during high speed operation of the engine.

22. The internal combustion engine structure of claim 16 further including electromagnetic means for selectively continuously holding said flap valve in a fully open position as during high speed operation of the engine.

* * * * *